US007563388B2

(12) United States Patent
Mather et al.

(10) Patent No.: US 7,563,388 B2
(45) Date of Patent: Jul. 21, 2009

(54) CROSSLINKED LIQUID CRYSTALLINE POLYMER, METHOD FOR THE PREPARATION THEREOF, AND ARTICLES DERIVED THEREFROM

(75) Inventors: Patrick T. Mather, Chagrin Falls, OH (US); Haihu Qin, Columbus, OH (US)

(73) Assignee: The University of Connecticut, Storrs, CT (US)

( * ) Notice: Subject to any disclaimer, the term of this patent is extended or adjusted under 35 U.S.C. 154(b) by 715 days.

(21) Appl. No.: 11/204,517

(22) Filed: Aug. 16, 2005

(65) Prior Publication Data

US 2007/0290167 A1 Dec. 20, 2007

Related U.S. Application Data

(60) Provisional application No. 60/605,022, filed on Aug. 27, 2004.

(51) Int. Cl.
*C09K 19/00* (2006.01)
*C09K 19/06* (2006.01)
*C09K 19/52* (2006.01)

(52) U.S. Cl. .............................. 252/299.01; 252/299.6; 252/299.63; 252/299.64; 252/299.68; 430/20; 430/270.1; 428/1.1

(58) Field of Classification Search ............ 252/299.01, 252/299.6, 299.63, 299.64, 299.68; 430/20, 430/270.1; 428/1.1
See application file for complete search history.

(56) References Cited

U.S. PATENT DOCUMENTS

| 5,385,690 | A | 1/1995 | Finkelmann et al. | |
|---|---|---|---|---|
| 6,160,084 | A | 12/2000 | Langer et al. | |
| 6,388,043 | B1 * | 5/2002 | Langer et al. | 528/80 |
| 6,679,605 | B2 | 1/2004 | Zhou et al. | |
| 6,720,402 | B2 * | 4/2004 | Langer et al. | 528/76 |
| 2004/0015187 | A1 | 1/2004 | Lendlein et al. | |
| 2004/0030062 | A1 | 2/2004 | Mather et al. | |
| 2006/0116503 | A1 | 6/2006 | Lendlein et al. | |

FOREIGN PATENT DOCUMENTS

| EP | 0705859 A1 | 4/1996 |
|---|---|---|
| WO | WO 01/40850 | 6/2001 |
| WO | WO 01/91822 | 12/2001 |
| WO | 2004046221 A1 | 6/2004 |
| WO | WO2004046221 | 6/2004 |
| WO | 2005012389 A1 | 2/2005 |
| WO | WO2005012389 | 2/2005 |

OTHER PUBLICATIONS

U.S. Appl. No. 11/096,021, filed Mar. 31, 2005, Mather et al.
JP2003205496; Jul. 22, 2003; Abstract Only (2 pages).
B. Donnio et al., "A Simple and Versatile Synthetic Route for the Preparation of Main-Chain, Liquid-Crystalline Elastomers", Macromolecules 2000, vol. 33, pp. 7724-7729.
D. L. Thomsen III et al., "Liquid Crystal Elastomers with Mechanical Properties of a Muscle", Macromolecules 2001, vol. 34, pp. 5868-5875.
A. Lendlein et al., "Shape Memory Polymers", Agnew. Chem. Int. Ed. 2002, vol. 41, pp. 2034-2057.
I. A. Rousseau et al., "Shape Memory Effect Exhibited by Smectic-C Liquid Crystalline Elastomers", Journal of the American Chemical Society 2003, vol. 125, pp. 15300-15301.
H. Qin et al., "Synthesis and Characterization of Unsaturated Thermotropic Polyesters Prepared via Acrylic Diene Metathesis Polymerizations", Macromolecules, vol. 37, No. 14, pp. 5239-5249 (2004).
I. A. Rousseau et al., "Shape Memory Effect in Smectic-C Liquid Crystalline Elastomers", Polymer Preprints (2004), 45(2), 81-82.
Liu, C. et al., "Chemically Cross-Linked Polycyclooctene: Synthesis, Characterization, and Shape Memory Behavior", Macromolecules 2002, 35, pp. 9868-9874.
Ingrid Rousseau, Development of Soft Polymeric Networks Showing Actuation Behavior: From Hydrogels to Liquid Crystalline Elastomers, Dissertation, University of Connecticut, 2004.
Joo et al., "Synthesis of Liquid Crystalline Polyesters of Various Types by Acyclic Diene Methathesis Polymerization", Macromolecules 2000, 33, pp. 6704-6712.
Rousseau et al., "Tailored Phase Transitions via Mixed-Mesogen Liquid Crystalline Polymers with Silicon-Based Spacers", Macromolecules 2005, 38, pp. 4103-4113.
Walba et al., "Main-Chain Ferroelectric Liquid Crystal Oligomers by Acyclic Diene Metathesis Polymerization", J. Am. Chem. Soc. 1996, 118, pp. 2740-2741.
Kim et al., "Effect of Molecular Weight on the Rheological Behavior of Thermotropic Liquid-Crystalline Polymer", Macromolecules 1993, 26, pp. 6633-6642.
International Search Report; International Application No. PCT/US2005/029351; International Filing Date Aug. 16, 2005; Date of Mailing Aug. 3, 2006 (4 pages).

* cited by examiner

*Primary Examiner*—Geraldina Visconti
(74) *Attorney, Agent, or Firm*—Cantor Colburn LLP

(57) ABSTRACT

Described are compositions that include a crosslinked polymer obtained on crosslinking a particular class of uncrosslinked polymers having in-chain aliphatic double bonds. The compositions exhibit unusual shape memory properties, and they may be used to form objects that exhibit at least three different shapes as a function of temperature.

34 Claims, 4 Drawing Sheets

CROSSLINKED LIQUID CRYSTALLINE POLYMER, METHOD FOR THE PREPARATION THEREOF, AND ARTICLES DERIVED THEREFROM

CROSS REFERENCE TO RELATED APPLICATIONS

This application claims the benefit of U.S. Provisional Patent Application Ser. No. 60/605,022, filed Aug. 27, 2004.

BACKGROUND OF THE INVENTION

"One-way" shape memory materials feature an ability to transform shape from a temporary, frozen, shape to a permanent shape when triggered by an environmental stimulus, such as heat, light, or vapor. Used creatively, these phenomena can be exploited for a wide range of applications. While both shape memory alloys (SMAs, e.g., nickel-titanium alloys) and shape memory polymers (SMPs) show similar thermo-stimulated shape memory properties, their mechanisms of action are quite distinct. Advantages of SMAs include rapid strain recovery (within 1 second), the potential training for two-way reversible memory, and an apparent superelasticity within the austenite phase at temperatures near but above the martensite-austenite transition temperature. In contrast, polymers intrinsically exhibit shape memory effects derived from their highly coiled constituent chains that are collectively extensible via mechanical work, and this energy may be stored indefinitely ("shape fixed") by cooling below the glass transition temperature, $T_g$, of an amorphous polymer, or the melting point, $T_m$, of a crystalline or semicrystalline polymer. After shape fixing, the polymeric sample can later perform mechanical work and return to a stress-free state when heated above the critical temperature, mobilizing the frozen chains to regain the entropy of their coiled state. In comparison to SMAs, thermally stimulated SMPs have the advantages of large recoverable deformations in excess of several hundred percent strain, facile tuning of transition temperatures through variation of the polymer chemistry, and processing ease at low cost.

So-called "two-way" shape memory polymers, implemented in a common example as nematic elastomers, have been prepared and studied. Tensile specimens of two-way shape memory polymers switch reversibly between short and long sample lengths, whether above or below a first order nematic-isotropic phase transition, respectively. Known "two-way" shape memory polymers are rubbery at room temperature, with different materials exhibiting different levels of strain and force capability.

While "one-way" and "two-way" shape memory polymers have been separately developed, no single polymer or metal has yet been prepared to exhibit both phenomena in the same material. Such a material would be desirable for its ability to exhibit three distinct shapes as a function of temperature.

BRIEF DESCRIPTION OF THE INVENTION

The present inventors have discovered crosslinked polymers that, at once, feature one-way and two-way shape memory effects at distinct shape transition temperatures, $T_1$ and $T_2$, respectively. In one embodiment, both shape transition temperatures are greater than room temperature. The crosslinked polymer can be therefore be transformed between three distinct shapes: one stable below $T_1$, $S_L$, one between $T_1$ and $T_2$, $S_M$, and the other above $T_2$, $S_H$. The shape transformations can be triggered by heating or by some other environmental stimulus. An unprecedented phenomenon exhibited by the material is a dramatic reversal in tensile elongation direction (i.e., sign of strain rate) on continuous heating: first a sharp increase in length at $T_1$, then a sharp return to the original length at $T_2$. In an o-ring configuration, such a phenomenon could be exploited for valves that open only for a certain range of temperature, in this case for temperature between $T_1$ and $T_2$. As another example, shrinkwrap tubing could be developed to expand at one heat setting (e.g., of a heating gun) and contract at a higher setting.

Thus, one embodiment is a crosslinked polymer obtained on crosslinking an uncrosslinked polymer comprising repeating units having the structure

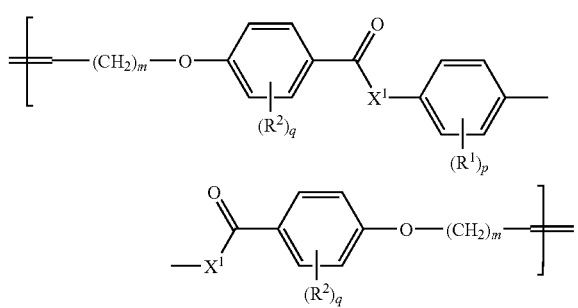

wherein each occurrence of $R^1$ is independently selected from $C_4$-$C_{10}$ tertiary alkyl, $C_6$-$C_{12}$ primary or secondary alkyl, $C_4$-$C_{10}$ tertiary alkoxy, $C_6$-$C_{12}$ primary or secondary alkoxy, unsubstituted or substituted phenoxy, unsubstituted or substituted thiophenoxy, unsubstituted or substituted benzyl, unsubstituted or substituted benzoyl, unsubstituted or substituted phenyl sulfonyl, unsubstituted or substituted phenyl sulfinyl; p is 1, 2, 3, or 4; each occurrence of $R^2$ is independently $C_1$-$C_{12}$ hydrocarbyl; each occurrence of q is independently 0, 1, 2, 3, or 4; each occurrence of m is independently 1, 2, 3, 4, or 5; and each occurrence of $X^1$ is —O— or —NH—.

Another embodiment is a composition comprising a crosslinked polymer, wherein the crosslinked polymer consists essentially of first repeating units having the structure

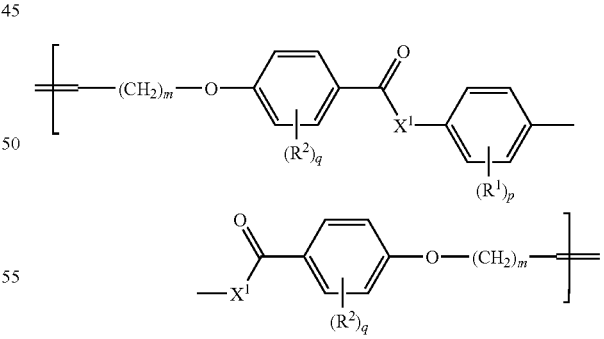

wherein each occurrence of $R^1$ is independently selected from $C_4$-$C_{10}$ tertiary alkyl, $C_6$-$C_{12}$ primary or secondary alkyl, $C_4$-$C_{10}$ tertiary alkoxy, $C_6$-$C_{12}$ primary or secondary alkoxy, unsubstituted or substituted phenoxy, unsubstituted or substituted thiophenoxy, unsubstituted or substituted benzyl, unsubstituted or substituted benzoyl, unsubstituted or substituted phenyl sulfonyl, unsubstituted or substituted phenyl sulfinyl; p is 1, 2, 3, or 4; each occurrence of $R^2$ is independently $C_1$-$C_{12}$ hydrocarbyl; each occurrence of q is independently 0, 1, 2, 3, or 4; each occurrence of m is independently 1, 2, 3, 4, or 5; and each occurrence of $X^1$ is —O— or —NH—; and second repeating units having the structure

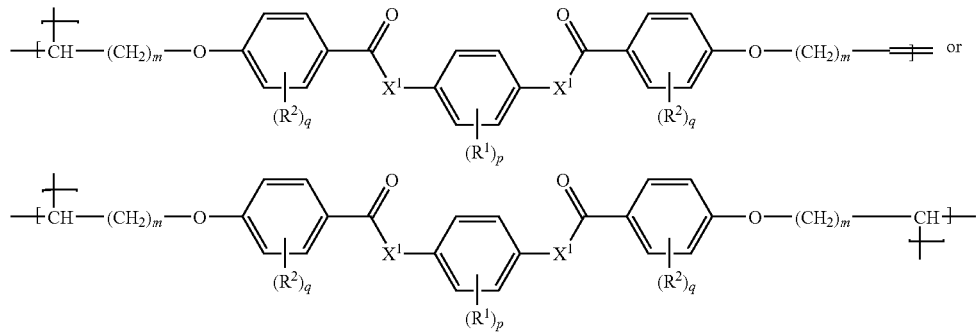

wherein $R^1$, p, $R^2$, q, m, and $X^1$ are as defined above.

Other embodiments, including a method of preparing the composition, and articles comprising the composition, are described in detail below.

DETAILED DESCRIPTION OF THE INVENTION

Figure 1:
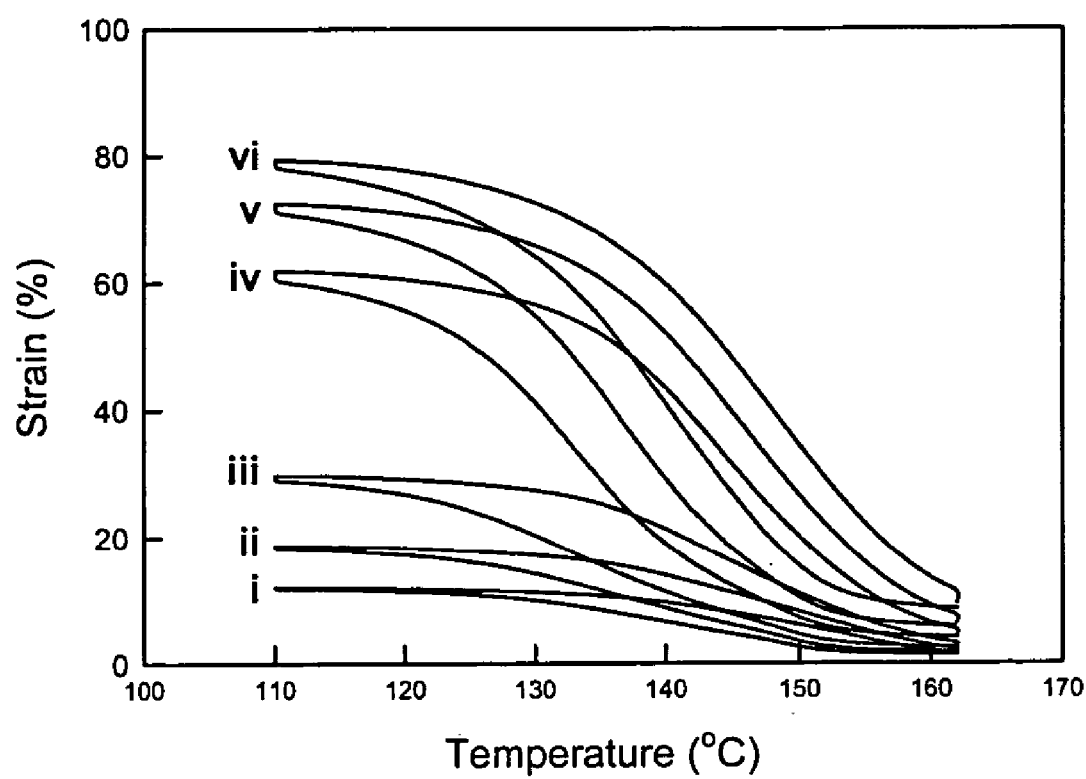
FIG. 1 is a plot of data from Example 4 showing two-way shape memory cycles of crosslinked polymer as a function of applied stress.

One embodiment is a crosslinked polymer obtained on crosslinking an uncrosslinked polymer comprising repeating units having the structure

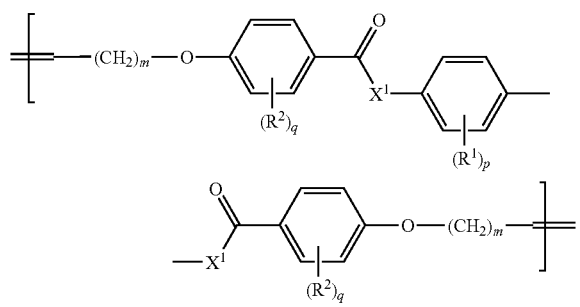

wherein each occurrence of $R^1$ is independently selected from $C_4$-$C_{10}$ tertiary alkyl, $C_6$-$C_{12}$ primary or secondary alkyl, $C_4$-$C_{10}$ tertiary alkoxy, $C_6$-$C_{12}$ primary or secondary alkoxy, unsubstituted or substituted phenoxy (—OPh), unsubstituted or substituted thiophenoxy (—SPh), unsubstituted or substituted benzyl (—CH$_2$Ph), unsubstituted or substituted benzoyl (—C(=O)Ph), unsubstituted or substituted phenyl sulfonyl (—S(=O)$_2$Ph), unsubstituted or substituted phenyl sulfinyl (—S(=O)Ph); p is 1, 2, 3, or 4; each occurrence of $R^2$ is independently $C_1$-$C_{12}$ hydrocarbyl; each occurrence of q is independently 0, 1, 2, 3, or 4; each occurrence of m is independently 1, 2, 3, 4, or 5; and each occurrence of $X^1$ is —O— or —NH—. When the value of m is greater than 5, the crosslinked polymer tends to exhibit smectic rather than nematic phase behavior. In one embodiment, each occurrence of m is 3. In one embodiment, $R^1$ is t-butyl and p is 1. In one embodiment, each occurrence of q is 0. In one embodiment, each occurrence of $X^1$ is —O—. In one embodiment, $R^1$ is t-butyl and p is 1, each occurrence of q is 0, each occurrence of m is 3, and each occurrence of $X^1$ is —O—. As used herein, the term "hydrocarbyl", whether used by itself, or as a prefix, suffix, or fragment of another term, refers to a residue that contains only carbon and hydrogen. The residue may be aliphatic or aromatic, straight-chain, cyclic, bicyclic, branched, saturated, or unsaturated. It may also contain combinations of aliphatic, aromatic, straight chain, cyclic, bicyclic, branched, saturated, and unsaturated hydrocarbon moieties. The hydrocarbyl residue, when so stated however, may contain heteroatoms over and above the carbon and hydrogen members of the substituent residue. Thus, when specifically noted as containing such heteroatoms, the hydrocarbyl residue may also contain carbonyl groups, amino groups, hydroxyl groups, or the like, or it may contain heteroatoms within the backbone of the hydrocarbyl residue. Similarly, when phenoxy, thiophenoxy, benzyl, benzoyl, sulfonyl, and sulfinyl residues are referred to as "substituted", they may comprise one or more substituents that do not interfere with the synthesis or properties of the crosslinked polymer such as, for example, $C_1$-$C_6$ alkyl, $C_1$-$C_6$ alkoxy, halogen (including fluorine, chlorine, bromine, and iodine), hydroxyl, amino, $C_1$-$C_6$ alkylamino, $C_2$-$C_{12}$ dialkylamino, $C_2$-$C_{12}$ acyl, amido, $C_2$-$C_{12}$ alkylamido, $C_3$-$C_{12}$ dialkylamido, and the like.

In one embodiment, the uncrosslinked polymer consists essentially of the repeating units described above. The phrase "consisting essentially of" excludes other units that substantially and adversely affect the shape memory properties. When the uncrosslinked polymer "consists of" the repeating units, the polymer chain is terminated at each end with methylidene groups.

In another embodiment, the uncrosslinked polymer comprises, in addition to the repeating units defined above, other repeating units so as to yield copolymers. In one embodiment, the other repeating units form flexible segments whose homopolymers are not liquid crystalline. Other repeat units include those formed from polymerization of α,ω-divinyl molecules, such as butadiene and α,ω-divinylsiloxanes, and unsaturated cyclic hydrocarbons subject to ring-opening polymerization, including cyclooctene, cyclooctadiene, and norbornene.

In one embodiment, the uncrosslinked polymer comprises about 5 to about 100 of the repeating units. Within this range, at least 10 repeating units are preferred.

The uncrosslinked polymer may be crosslinked by any method capable of forming a carbon-carbon single bond between an aliphatic carbon atom in a first uncrosslinked polymer chain and an aliphatic carbon atom in a second uncrosslinked polymer chain. For example, crosslinking may comprise reacting the uncrosslinked polymer with a free radical precursor under conditions suitable for generating free radicals from the free radical precursor. As another example, the uncrosslinked polymer may be crosslinked with a particle beam or electromagnetic radiation. Specifically, crosslinking may comprise exposing the uncrosslinked polymer to an electron beam or electromagnetic radiation having a wavelength ranging from about 0.1 picometer (i.e., gamma radiation) to about 400 nanometers (i.e., ultraviolet irradiation). When the composition is cured by exposure to electromagnetic radiation, particularly ultraviolet light, the composition may further include a photoinitiator. Suitable photoinitiators are known in the art and are commercially available from, for example, Sigma-Aldrich. Suitable photoinitiators include, for example, benzil ketals, α-dialkoxyacetophenones, α-hydroxyalkylphenones, α-aminoalkylphenones, titanocenes, and the like, and combinations thereof.

In one embodiment, crosslinking comprises reacting about 0.1 to about 30 percent of the aliphatic carbon-carbon double bonds in the uncrosslinked polymer. Within this range, the percentage of reacted aliphatic carbon-carbon double bonds may specifically be at least about 1, more specifically at least about 5, still more specifically at least about 10. Also within this range, the percentage of reacted aliphatic carbon-carbon double bonds may specifically be up to about 25, more specifically up to about 20.

The composition may comprise about 1 to 100 weight percent of the crosslinked polymer. Within this range, the crosslinked polymer amount may specifically be at least about 5 weight percent, more specifically at least about 10 weight percent. Also within this range, the crosslinked polymer amount may specifically be up to about 99 weight percent, more specifically up to about 95 weight percent, still more specifically up to about 90 weight percent.

In addition to the crosslinked polymer, the composition may include various additives to improve properties of the composition and articles formed therefrom. In one embodiment, the composition further comprises an additive selected from liquid crystalline diluents (e.g., the nematic compound n-pentylcyanobiphenyl, which may allow reduction of $T_g$ and the nematic-isotropic transition temperature, $T_{NI}$), rubbers comprising crosslinkable functionality (e.g., polybutadienes, and styrene-butadiene block copolymers, which are useful to reduce the modulus of the composition), reinforcing fillers (e.g., glass fibers, which are useful to increase the modulus of the composition), conductive fillers (including both thermally conductive and electrically conductive fillers; e.g., graphite, carbon nanotubes, and boron nitride, which are useful to increase the thermal conductivity of the composition and thereby accelerate shape memory effects that involve heat transfer), and the like, and combinations thereof. Where the additives mentioned above form a phase distinct from that of the crosslinked polymer, they may be present as discrete particles, as a co-continuous phase, or as a discrete layer in a bilayer or multilayer article. Furthermore, additives forming a distinct phase may be present as a phase having dimensions on the nanometer (e.g., 10-100 nanometers), micrometer, or millimeter scale.

One embodiment is a composition comprising a crosslinked polymer obtained on crosslinking an uncrosslinked polymer having the structure

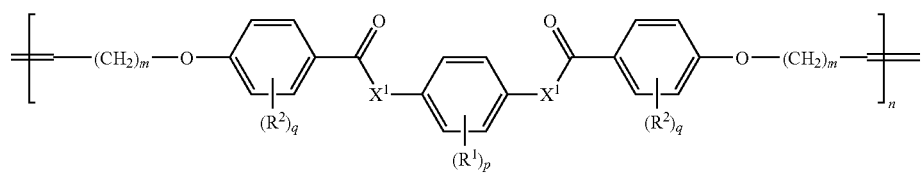

wherein each occurrence of $R^1$ is independently selected from $C_4$-$C_{10}$ tertiary alkyl, $C_6$-$C_{12}$ primary or secondary alkyl, $C_4$-$C_{10}$ tertiary alkoxy, $C_6$-$C_{12}$ primary or secondary alkoxy, unsubstituted or substituted phenoxy, unsubstituted or substituted thiophenoxy, unsubstituted or substituted benzyl, unsubstituted or substituted benzoyl, unsubstituted or substituted phenyl sulfonyl, unsubstituted or substituted phenyl sulfinyl; p is 1, 2, 3, or 4; each occurrence of $R^2$ is independently $C_1$-$C_{12}$ hydrocarbyl; each occurrence of q is independently 0, 1, 2, 3, or 4; each occurrence of m is independently 1, 2, 3, 4, or 5; each occurrence of $X^1$ is —O— or —NH—; and n is about 5 to about 100. In one embodiment, $R^1$ is t-butyl and p is 1, each occurrence of q is 0, each occurrence of m is 3, and each occurrence of $X^1$ is —O—.

One embodiment is a composition comprising a crosslinked polymer consisting essentially of first repeating units having the structure

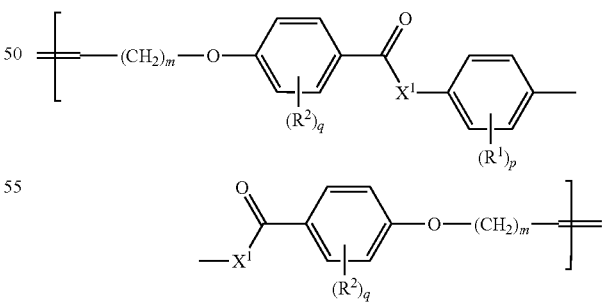

wherein each occurrence of $R^1$ is independently selected from $C_4$-$C_{10}$ tertiary alkyl, $C_6$-$C_{12}$ primary or secondary alkyl, $C_4$-$C_{10}$ tertiary alkoxy, $C_6$-$C_{12}$ primary or secondary alkoxy, unsubstituted or substituted phenoxy, unsubstituted or substituted thiophenoxy, unsubstituted or substituted benzyl, unsubstituted or substituted benzoyl, unsubstituted or substituted phenyl sulfonyl, unsubstituted or substituted phenyl sulfinyl; p is 1, 2, 3, or 4; each occurrence of $R^2$ is independently $C_1$-$C_{12}$ hydrocarbyl; each occurrence of q is independently 0, 1, 2, 3, or 4; each occurrence of m is independently 1, 2, 3, 4, or 5; and each occurrence of $X^1$ is —O— or —NH—; and second repeating units having the structure

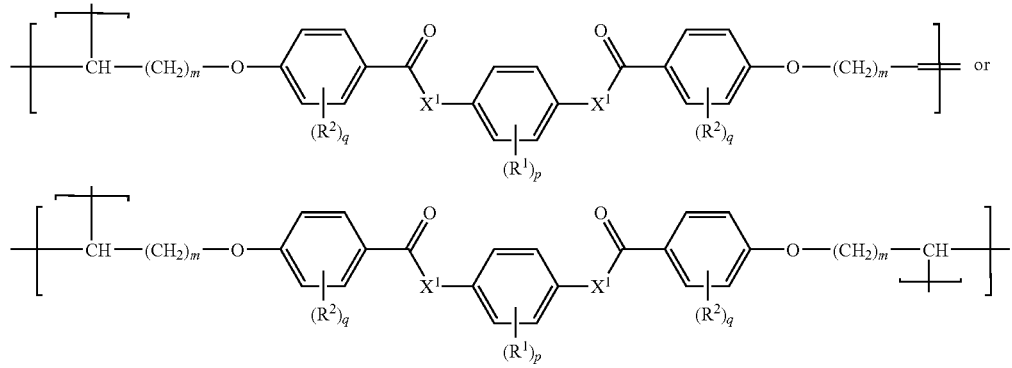

wherein $R^1$, p, $R^2$, q, m, and $X^1$ are as defined above. In the above structures, the single bonds extending vertically above and below the second repeating units represent crosslinks with a chain or between chains. In this embodiment, the crosslinked polymer may optionally comprise about 70 to about 99 weight percent of the first repeating units, and about 1 to about 30 weight percent of the second repeating units. In one embodiment, $R^1$ is t-butyl and p is 1, each occurrence of q is 0, each occurrence of m is 3, and each occurrence of $X^1$ is —O—.

The crosslinked polymer may exhibit one or more of the following desirable properties. The crosslinked polymer may exhibit a glass transition temperature of about 0 to about 100° C. Within this range, the glass transition temperature may specifically be at least 10° C., more specifically at least 25° C. Also within this range, the glass transition temperature may specifically be up to about 70° C., more specifically up to about 50° C. The crosslinked polymer may exhibit, on heating and exposure to a mechanical stress of about 10 to about 1000 kilopascals (kPa), a nematic-isotropic transition temperature that is about 5 to about 100° C. greater than the glass transition temperature. Within the above mechanical stress range of about 10 to about 1000 kPa, the mechanical stress may specifically be at least about 25 kPa, more specifically at least about 50 kPa. Also within the above range, the mechanical stress may specifically be up to about 500 kPa, more specifically up to about 100 kPa. Within the above range of temperature differences between the nematic-isotropic transition temperature ($T_{NI}$) and the glass transition temperature ($T_g$), $T_{NI}$ may specifically be at least about 10° C. greater than $T_g$, more specifically at least about 20° C. greater than $T_g$. Also within the above range of temperature differences between the nematic-isotropic transition temperature ($T_{NI}$) and the glass transition temperature ($T_g$), $T_{NI}$ may specifically be up to about 90° C. greater than $T_g$, more specifically up to about 80° C. greater than $T_g$. The crosslinked polymer may exhibit, on cooling and exposure to a mechanical stress of about 10 to 1000 kPa, a transition from a polydomain nematic phase to a monodomain nematic phase at a temperature of about 5 to about 100° C. higher than the glass transition temperature. Within the above range of temperature difference between the polydomain-monodomain transition temperature ($T_{PM}$) and the glass transition temperature ($T_g$), $T_{PM}$ may specifically be at least about 10° C. greater than $T_g$. Also within the above range of temperature differences between the nematic-isotropic transition temperature ($T_{PM}$) and the glass transition temperature ($T_g$), $T_{NI}$ may specifically be up to about 80° C. greater than $T_g$, more specifically up to about 55° C. greater than $T_g$. The same specific mechanical stress limits described above in the context of $T_{NI}$ also apply in the context of $T_{PM}$.

One embodiment is a method of forming a crosslinked polymer, comprising crosslinking an uncrosslinked polymer comprising repeating units having the structure

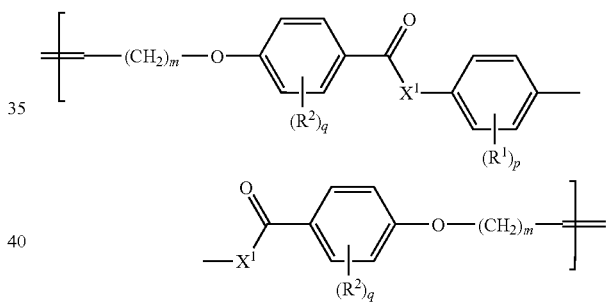

wherein each occurrence of $R^1$ is independently selected from $C_4$-$C_{10}$ tertiary alkyl, $C_6$-$C_{12}$ primary or secondary alkyl, $C_4$-$C_{10}$ tertiary alkoxy, $C_6$-$C_{12}$ primary or secondary alkoxy, unsubstituted or substituted phenoxy, unsubstituted or substituted thiophenoxy, unsubstituted or substituted benzyl, unsubstituted or substituted benzoyl, unsubstituted or substituted phenyl sulfonyl, unsubstituted or substituted phenyl sulfinyl; p is 1, 2, 3, or 4; each occurrence of $R^2$ is independently $C_1$-$C_{12}$ hydrocarbyl; each occurrence of q is independently 0, 1, 2, 3, or 4; each occurrence of m is independently 1, 2, 3, 4, or 5; and each occurrence of $X^1$ is —O— or —NH—. As mentioned above, crosslinking may comprise reacting the uncrosslinked polymer with a free radical precursor under conditions suitable for generating free radicals from the free radical precursor. In one embodiment, the composition exhibits, on heating and exposure to a mechanical stress of about 10 to 1000 kPa, a nematic-isotropic transition temperature, and the free-radical precursor has a thermal decomposition half-life of ten minutes in the composition at a temperature less than the nematic-isotropic transition temperature. Suitable free-radical precursors include any compound capable of producing radicals at elevated temperatures. Such curing catalysts may include both peroxy and non-peroxy based compounds. Suitable free-radical precursors include those compounds described as curing catalysts in "Plastic Additives Handbook, 5th Edition" Hans Zweifel, Ed, Carl Hanser Verlag Publishers, Munich, 2001, and in U.S. Pat. No. 5,407,972 to Smith et al., and U.S. Pat. No. 5,218,030 to Katayose et al. Examples of useful peroxy compounds include, for example, benzoyl peroxide, dicumyl peroxide, methyl ethyl ketone peroxide, lauryl peroxide, cyclohexanone peroxide, t-butyl hydroperoxide, t-butyl benzene hydroperoxide, t-butyl peroctoate, 2,5-dimethylhexane-2,5-dihydroperoxide, 2,5-dimethyl-2,5-di(t-butylperoxy)-hex-3-yne, di-t-butylperoxide, t-butylcumyl peroxide, α,α-bis(t-butylperoxy-m-isopropyl)benzene, 2,5-dimethyl-2,5-di(t-butylperoxy)hexane, dicumyl peroxide, di(t-butylperoxy isophthalate, t-butylperoxybenzoate, 2,2-bis(t-butylperoxy)butane, 2,2-bis(t-butylperoxy)octane, 2,5-dimethyl-2,5-di(benzoylperoxy)hexane, di(trimethylsilyl)peroxide, trimethylsilylphenyltriphenylsilyl peroxide, and the like, and mixtures thereof. Typical non-peroxy compounds include, for example, 2,3-dimethyl-2,3-diphenylbutane, 2,3-trimethylsilyloxy-2,3-diphenylbutane, and the like, and mixtures thereof. In one embodiment, the free-radical precursor comprises dicumyl peroxide. In one embodiment, the free radical precursor may be used in an amount of about 0.01 to about 1 mole per mole of aliphatic double bonds in the uncrosslinked polymer.

As mentioned above, crosslinking may also be achieved by exposing the uncrosslinked polymer to an electron beam or electromagnetic radiation having a wavelength of about 0.1 picometer to about 400 nanometers.

One embodiment is an article comprising any of the above-described compositions. The two-stage shape memory behavior of the crosslinked polymers makes them particularly useful. Two temporary shapes can be stored in memory, allowing for complex deployment, prescribed during processing, on simple heating. The two temporary shapes, combined with the equilibrium shape under deployment conditions, make it possible for the article to exhibit three shapes as a function of temperature. Articles that may be fabricated from the crosslinked polymer include, for example, heat shrink tubing, heat shrink tape, shape memory fibers, valves, temperature sensors, packaging sensors, complex actuators (e.g., twist followed by constriction), dental ligation mechanisms (e.g., orthodontic o-rings), catheters, hinges, and the like. The "top hat" mechanism of FIG. 2 makes the crosslinked polymer useful for fabrication of a valve that effectively functions like a band pass filter. The valve would be closed at low and high temperatures, but in an intermediate temperature range above $T_g$ but below $T_{NI}$ a pressurized fluid would be able to pass through a valve containing the crosslinked polymer as a constraining ring. In thin film form, the crosslinked polymer can undergo an optical clearing corresponding to the polydomain to monodomain nematic transition. This property makes it possible to fabricate devices that allow light transmission only within a certain temperature range.

The invention is further illustrated by the following non-limiting examples.

EXAMPLE 1

This example describes the synthesis of the monomer 5tB, which involves a two-step organic synthesis with the 5-pentenyloxybenzoic acid as the intermediate. First, in a 3-neck 500 milliliter (mL) round bottom flask under stirring, 30 grams (0.217 mol) 4-hydroxybenzoic acid were added to 135 mL of methanol, followed by the drop-wise addition of 45 mL of an aqueous solution of potassium hydroxide (45 weight percent). When the solution became clear, 36.6 grams of 5-bromo-1-pentene (0.254 mol) was added dropwise to the solution using an addition funnel. After refluxing for 16 hours, the mixture was then cooled to room temperature and poured into 500 mL of deionized water to form a transparent yellow solution. An organic phase was then extracted with 100 mL diethyl ether (alternatively, hexanes) three times. To the aqueous phase, 100 mL of a 37% hydrochloric acid solution were added, leading to the precipitation of the desired product. The precipitate, which is 5-pentenyloxybenzoic acid, was collected after filtration and further recrystallized from ethanol.

Twelve grams (0.0586 mol) 5-pentenyloxybenzoic acid, 12.0 grams (0.0585 mol) 1,3-dicyclohexyl carbodiimide (DCC), 4.86 grams t-butyl hydroquinone (0.0293 mol) and 0.64 grams 4-(dimethylamino) pyridine (DMAP) were added to a 250 mL Erlenmeyer flask. To this flask, 120 mL anhydrous methylene chloride was added, leading to a quick formation of a clear solution. The solution quickly became milky as the reactions proceeded and was continuously stirred for 48 hours. At the end of the reaction, a white solid as a byproduct was removed by filtration, leaving a clear brown solution of the desired product in methylene chloride. After the removal of $CH_2Cl_2$ by evaporation, the raw product was collected as a brown solid. The raw material was purified by the column chromatography with a mixture solvent of hexane and ethyl acetate (volume ratio 7:1) as the eluent to give an as-purified yield of approximately 50%.

Differential scanning calorimetry (DSC) using a TA Instruments DSC2910 calibrated against standard samples such as indium was used to characterize the mesophase transitions of 5tB. Samples weighing approximately 5 mg were employed. The 5tB monomer described above had a crystalline to nematic transition temperature of 83° C. and a nematic to isotropic transition of 89° C.

EXAMPLE 2

This example describes the polymerization of 2-tert-butyl-1,4-phenyl bis(4-pentenyloxybenzoate), hereinafter "5tB", to form the polymer designated "P5tB" having the following structure:

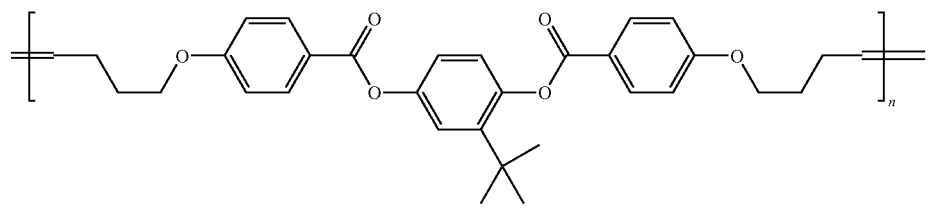

wherein n has a value corresponding to the molecular weight characterization described below. Characterization of P5tB is also described.

The solvent for the polymerization, toluene, was vacuum transferred over sodium and benzophenone and then stored in a dry glovebox. Grubbs catalyst (benzylidene-bis(tricyclohexylphosphine)dichlororuthenium; Chemical Abstracts Registry No. 172222-30-9) and tris(hydroxymethyl)phosphine were purchased from Strem Co. Other Chemicals and solvents were purchased from common commercial sources and used as received.

In an inert gas-charged glovebox, 1.54 g (2.84 millimole) of 5tB monomer, 6 mL of anhydrous toluene, a magnetic stirrer bar, and 48 milligrams of Grubbs catalyst (0.058 millimole, [5tB]/[catalyst]=49) were mixed in a septum-sealed Schlenk flask. The flask was then removed from the glovebox and heated in an oil bath to 55° C. under magnetic stirring while argon was purged through the system. Upon stirring, the mixture quickly became homogeneous as a brownish purple solution with evolution of a gas, presumably ethylene. As the reaction proceeded, the solution viscosity increased noticeably while the color of the polymerization solution became increasingly darker (eventually black), indicating catalyst degradation. After six hours, the reaction was terminated by first cooling to room temperature and then precipitating in 10-fold excess methanol. An overall schematic representation for this acyclic diene metathesis (ADMET) polymerization is given in Scheme 1.

polymer. Samples were dissolved in tetrahydrofuran at a concentration of about 0.1 weight percent and injected at 35° C. with tetrahydrofuran as the eluent at a flow rate of 1.0 milliliter per minute. Values of molecular weight and molecular weight distribution are based on calibration with monodispersed polystyrene standards having molecular weights of 472, 982, 4000, 6930, 43,000, 400,000, and 824,000 grams per mole, obtained from Polymer Standards Service-USA, Inc. The polymer sample described above had a number average molecular weight of 9.6 kiloDaltons and a polydispersity index of 1.45.

Synthesis and characterization of additional P5tB samples, including the use of other polymerization catalysts, is described in H. Qin, B. J. Chaluski, I. A. Rousseau, J. Chen, X.-Q. Xie, P. T. Mather, G. S. Constable, E. B. Coughlin, *Macromolecules*, vol. 37, no. 14, pages 5239-5249 (2004).

EXAMPLE 3

This example describes the preparation of crosslinked P5tB, hereinafter "xP5tB". A sample of P5tB was mixed with 10 weight percent dicumyl peroxide and cured for 24 hours at 150° C. and 69 megaPascals (MPa) of nitrogen pressure without any solvent. After curing, the gel fraction was determined to be 85% after extraction with tetrahydrofuran for 24 hours.

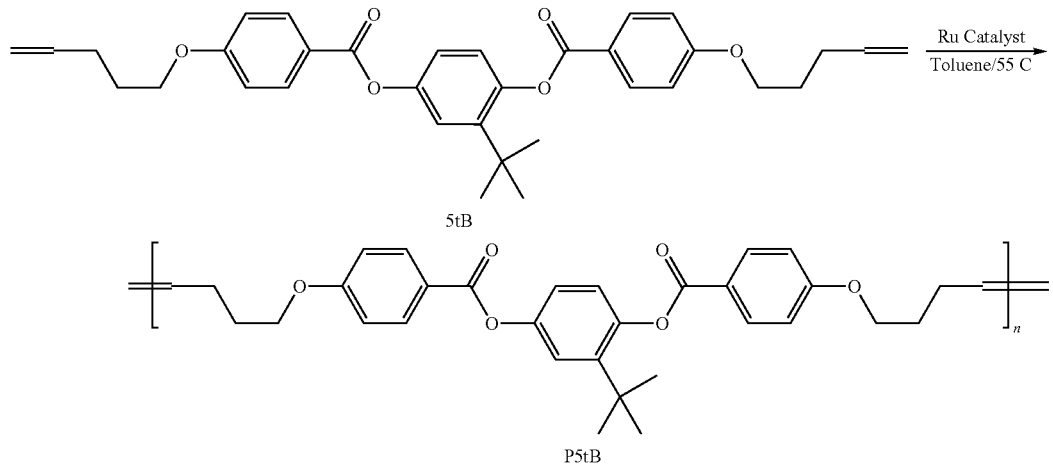

Scheme 1. Schematic Representation of the the Structure of 5tB Diene Monomer and Its ADMET Polymerization to Form a Liquid Crystalline Polymer, P5tB The dried solids exhibited a light brownish color, indicative of residual ruthenium complexes that were subsequently removed by dissolving in chloroform and washing with a 22% (weight/volume) solution of tris(hydroxymethyl)phosphine (THP) in 2-propanol, representing an excess of at least 22 molar equivalents of THP per catalyst molecule to be removed. After stirring the solution vigorously under an inert atmosphere at 55° C. for 24 hours, the polymer was precipitated from the solution with methanol, resulting in a white powder. The yield was greater than 75%.

Gel Permeation Chromatography (GPC), Waters Associates, 150-C Plus) with a PL-ELS 1000 control detector (Polymer Laboratories) was used to obtain the molecular weight (MW) and the molecular weight distribution (MWD) of the

EXAMPLE 4

This experiment describes two-way shape memory characterization of xP5tB. Shape memory experiments were performed on a TA Instruments DMA 2980 equipped with film tension fixtures. Shape memory effects under different stresses were characterized through the following cycles: initially, at the high temperature of 162° C., a prescribed stress was applied and the sample was annealed for 30 minutes to ensure that the sample was equilibrated; then the sample was cooled down slowly to 110° C. at the rate of 1° C./min (the sample was found to substantially elongate during this cooling course); after the temperature reached 110° C., the sample was annealed for another 30 minutes to eliminate any possible temperature gradients; then the sample was ramped back to 162° C. at 1° C./min with clear shrinkage occurring near the nematic-isotropic transition temperature, $T_{NI}$, and annealed there for 30 minutes to recover any residual deformation. This protocol was repeated several times with different loads and strain vs. temperature curves were recorded.

The crosslinked polymer xP5tB exhibits a good two-way shape memory effect despite its polydomain nature. FIG. 1 shows the two-way shape memory cycles under different stresses (the stresses were 3.67, 7.34, 11.01, 18.35, 25.68 and 36.70 kPa from curves (i) to (vi), respectively, relative to the original cross-sectional area of 2.72 mm$^2$). Maintaining constant load, the sample is elongated spontaneously during the course of cooling (the lower branch of the loop-like curves) to 110° C. at 1° C./min. The strain can be as high as 79.3% at a stress of 36.70 kPa (curve (vi)). Samples were then annealed isothermally at 110° C. for about 30 minutes. When heated back to 162° C. at 1° C./min, the sample gradually recovers toward its original length (upper branch of the loop-like curves). To eliminate any temperature gradients in the sample and between the sample-thermocouple, the sample is annealed at 162° C. for 30 minutes after which the sample recovered completely. The original strain (before deformation), maximum strain and strain after recovery are listed in Table 1. The recovery ratios, which are defined as the percentage of the recovery strain (maximum strain minus strain after recovery) to deformation strain (maximum strain minus original strain), are all essentially equal to 100%. During the deformation and recovery, a hysteresis of about 10° C. was observed.

TABLE 1

The two-way shape memory recovery ratio

| Stress (kPa) | Original Strain$^a$ (%) | Max Strain$^b$ (%) | Strain after recovery$^c$ (%) | Recovery ratio$^d$ % |
|---|---|---|---|---|
| 3.67 | 1.43 | 12.02 | 1.34 | 100.8 |
| 7.34 | 1.86 | 18.59 | 1.83 | 100.2 |
| 11.01 | 2.53 | 29.72 | 2.54 | 100.0 |
| 18.35 | 4.04 | 61.82 | 4.12 | 99.9 |
| 25.69 | 5.85 | 72.39 | 5.83 | 100.0 |
| 36.70 | 8.48 | 79.27 | 8.56 | 99.9 |

$^a$The strain after annealed at 162° C., but before any deformation and recovery.
$^b$The strain after deformation.
$^c$The strain after recovery during the heating and annealing at 162° C. for 30 min.
$^d$defined as the percentage of the recovery strain (max strain minus strain after recovery) to deformation strain (max strain minus original strain).

Figure 2:
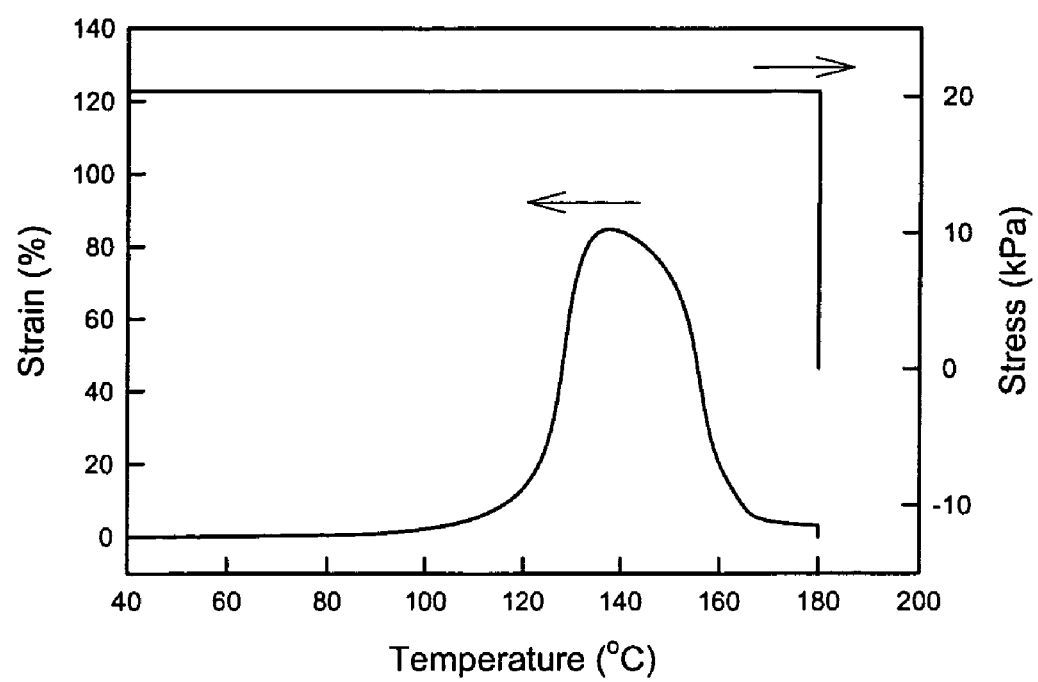
FIG. 2 is a plot of data from Example 4 showing the elongation-recovery curve for crosslinked polymer during heating under stress.

FIG. 2 shows a deformation and recovery curve for xP5tB under the stress of 20.4 kPa (sample cross-sectional area: 1.96 mm$^2$). With the preload stress of 20.4 kPa, the sample was heated from 40° C. to 180° C. at 1° C./min. The sample elongated, beginning near 100° C. and accelerating at 125° C., and then recovered through the polydomain-monodomain and nematic-isotropic transitions, respectively, giving a "top hat" like strain-temperature curve. After ramping to 180° C., most of the strain recovers except the amount resulting from the modulus difference between 180° C. and 40° C. This strain recovered upon unloading of the stress.

EXAMPLE 5

This experiment describes two-stage shape memory characterization of xP5tB. In addition to the two-way shape memory effect, xP5tB also exhibits one-way shape memory effect because of its crosslinked structure and sharp $T_g$ above room temperature. These two shape memory effects have different "recovery triggering temperatures". For the one-way shape memory effect, the recovery temperature is the glass transition temperature, $T_g$, while the two-way shape memory effect is triggered by the nematic-isotropic transitions temperature, $T_{NI}$. Thus, xP5tB samples possess "two-stage shape memory effects", which refers to the ability to deform and recover selectively in two different temperature ranges. Specifically, by cooling the sample through the polydomain-monodomain $(T_{PM})$ transition and subsequently incrementing the stress, the sample is elongated following the two distinct shape memory effects. The secondary strain which is caused by the secondary stress increment will recover selectively at the temperature above $T_g$ but significant below $T_{NI}$, while the rest of the strain recovers through the $T_{NI}$ transition.

Figure 3:
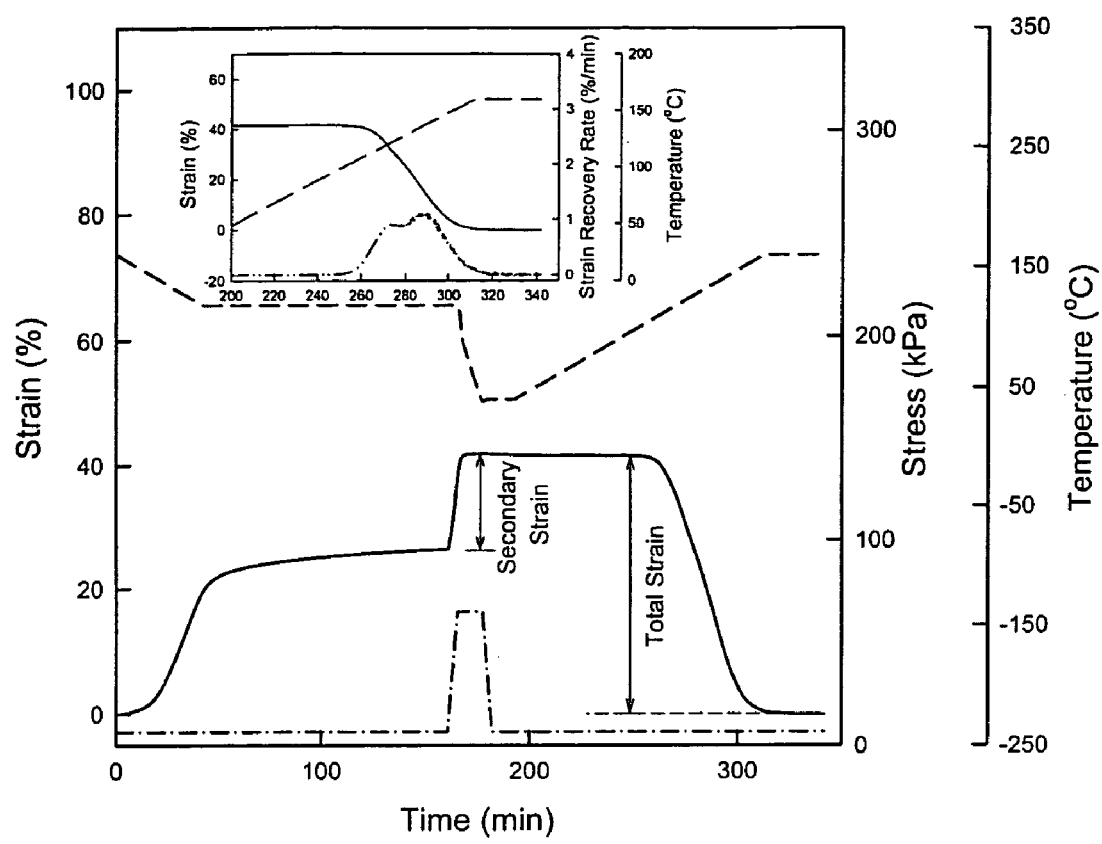
FIG. 3 is a plot of data from Example 5 showing a two-stage shape memory cycle for crosslinked polymer.

Direct experiments were designed to characterize the two-stage shape memory effect systematically. The sample was first annealed at 160° C. with a preload of 6.4 kPa (sample cross-sectional area 1.56 mm$^2$), and then deformed by the temperature ramping to 118.5° C. at 1° C./minute. After annealing at 118.5° C. for 120 minutes, a secondary strain was introduced by increasing the stress at 12.8 kPa/min to 58.5 kPa. Then the sample was quenched to 40° C. and annealed for 10 minutes to eliminate any temperature gradients. Subsequently, the load was completely removed at the same rate. By cooling the sample to below $T_g$, both strains were well fixed after unloading the secondary stress. On subsequent heating of the sample to a temperature higher than both "triggering" temperatures ($T_g$ and $T_{NI}$), it was observed that both strains were recovered completely. An example of the raw data is shown in FIG. 3, where the strain (solid), stress (dash-dot) and temperature (dash) against time are plotted for the entire history. In the inset of the same figure, the changes in strain (solid), strain recovery rate (dash-dot-dot) and temperature (dash) as functions of time during the recovery step are detailed. From the two peaks in the recovery rate curve (dash-dot-dot curve in the inset), two-stage recovery is apparent.

Figure 4:
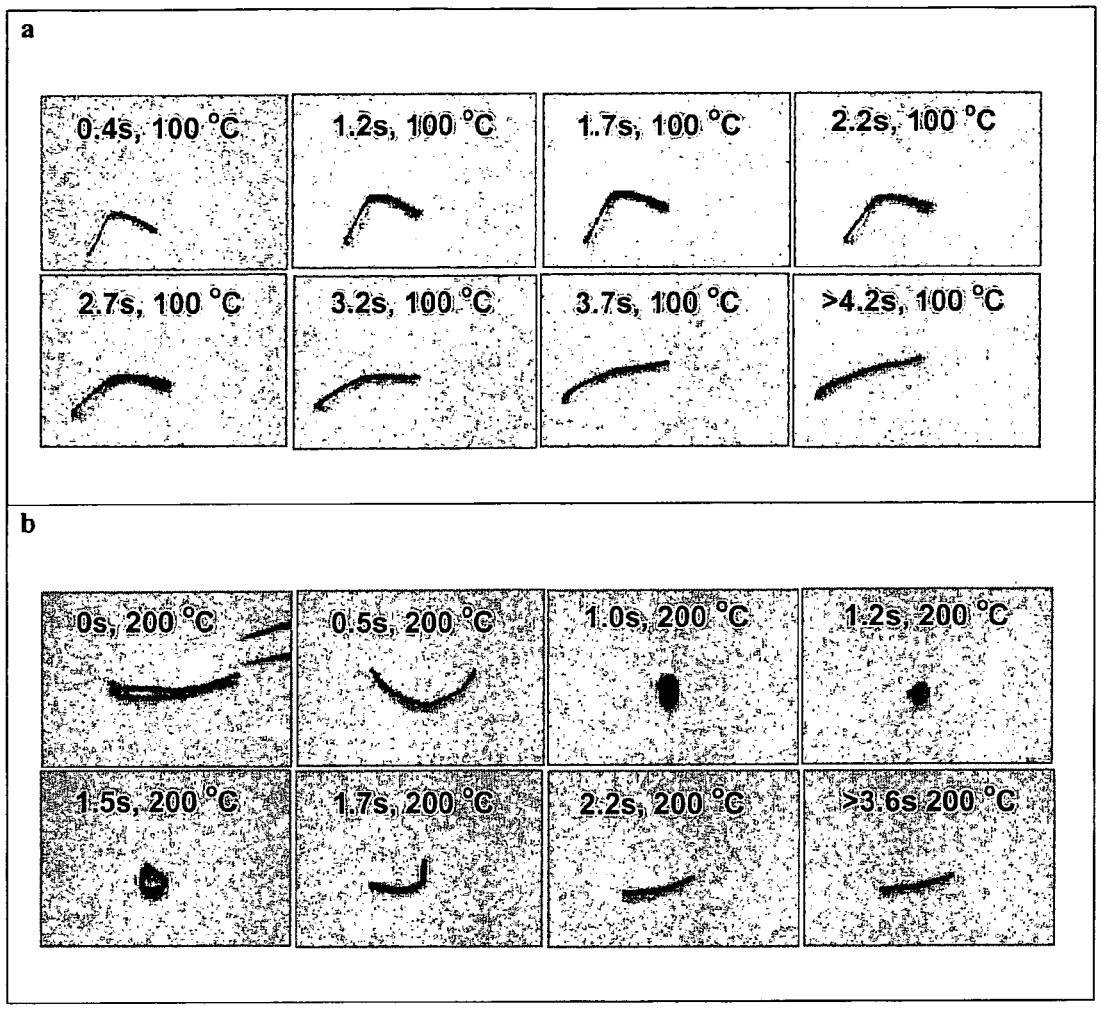
FIG. 4 shows two series of photographs from Example 5, depicting the shape evolution during the two-stage recovery of the sample.

As an example, direct visualization of the two-stage shape memory effect is demonstrated in FIG. 4, which clearly shows well resolved two-stage recovery. Before the experiment, the sample was first elongated according to the two-way shape memory mechanism, cooling under uniaxial tensile load, and then further deformed by bending following the one way shape memory mechanism inherent in this material. After cooling the sample below its $T_g$, both deformations were fixed. Series "a" of FIG. 4 shows the first stage recovery of the sample. For this, the sample was place on the top of a hot stage preheated to 100° C., a temperature above $T_g$ (80° C.) but significantly below $T_{NI}$. The sample rapidly unbent (within 4 seconds), but did not yet shrink, recovering the second stage deformation at the first stage of recovery. To trigger the second stage recovery the sample was next moved to another hot plate preheated to 200° C., 40° C. above $T_{NI}$ of this material. At that temperature, the sample shrank to its original length in less than 2.2 seconds, as shown in Series "b" of FIG. 4. Because the sample does not heat uniformly through the thickness, the sample undergoes significant coiling as one face shrinks more than the other, temporarily. By the end of the transient event the sample is straight again, indicating completion of two-stage recovery. The exposure times (in seconds, "s") and the environmental temperatures (in C) the sample was exposed to are listed at the top of each picture. The sample original length, equaling the sample length after the ultimate recovery, was about 20 millimeters.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

All cited patents, patent applications, and other references are incorporated herein by reference in their entirety.

The invention claimed is:

1. A composition, comprising:
   a crosslinked polymer obtained on crosslinking an uncrosslinked polymer comprising repeating units having the structure

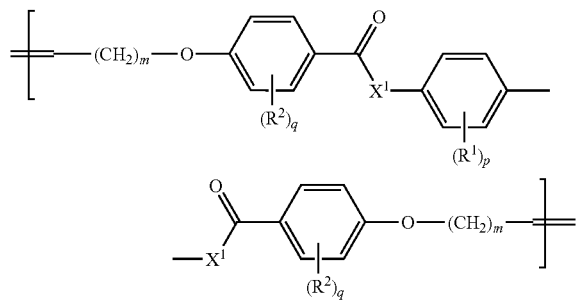

wherein each occurrence of $R^1$ is independently selected from $C_4$-$C_{10}$ tertiary alkyl, $C_6$-$C_{12}$ primary or secondary alkyl, $C_4$-$C_{10}$ tertiary alkoxy, $C_6$-$C_{12}$ primary or secondary alkloxy, unsubstituted or substituted phenoxy, unsubstituted or substituted thiophenoxy, unsubstituted or substituted benzyl, unsubstituted or substituted benzoyl, unsubstituted or substituted phenyl sulfonyl, unsubstituted or substituted phenyl sulfinyl; p is 1, 2, 3, or 4; each occurrence of $R^2$ is independently $C_1$-$C_{12}$ hydrocarbyl; each occurrence of q is independently 0, 1, 2, 3, or 4; each occurrence of m is independently 1, 2, 3, 4, or 5; and each occurrence of $X^1$ is —O— or —NH—.

2. The composition of claim 1, wherein $R^1$ is t-butyl and p is 1.

3. The composition of claim 1, wherein each occurrence of q is 0.

4. The composition of claim 1, wherein each occurrence of m is 3.

5. The composition of claim 1, wherein each occurrence of $X^1$ is —O—.

6. The composition of claim 1,
   wherein $R^1$ is t-butyl and p is 1;
   wherein each occurrence of q is 0;
   wherein each occurrence of m is 3; and
   wherein each occurrence of $X^1$ is —O—.

7. The composition of claim 1, wherein the uncrosslinked polymer consists essentially of the repeating units.

8. The composition of claim 1, wherein the uncrosslinked polymer further comprises flexible segments whose homopolymers are not liquid crystalline.

9. The composition of claim 1, wherein the uncrosslinked polymer comprises about 5 to about 100 of the repeating units.

10. The composition of claim 1, wherein said crosslinking comprises reacting the uncrosslinked polymer with a free radical precursor under conditions suitable for generating free radicals from the free radical precursor.

11. The composition of claim 1, wherein said crosslinking comprises exposing the uncrosslinked polymer to an electron beam or electromagnetic radiation having a wavelength of about 0.1 picometer to about 400 nanometers.

12. The composition of claim 1, wherein said crosslinking comprises reacting about 0.1 to about 30 percent of the aliphatic carbon-carbon double bonds in the uncrosslinked polymer.

13. The composition of claim 1, wherein said crosslinking comprises forming a carbon-carbon single bond between an aliphatic carbon atom in a first uncrosslinked polymer chain and an aliphatic carbon atom in a second uncrosslinked polymer chain.

14. The composition of claim 1, comprising about 1 to 100 weight percent of the crosslinked polymer.

15. The composition of claim 1, further comprising an additive selected from liquid crystalline diluents, rubbers comprising crosslinkable functionality, reinforcing fillers, conductive fillers, and combinations thereof.

16. A composition, comprising:
    a crosslinked polymer obtained on crosslinking an uncrosslinked polymer having the structure

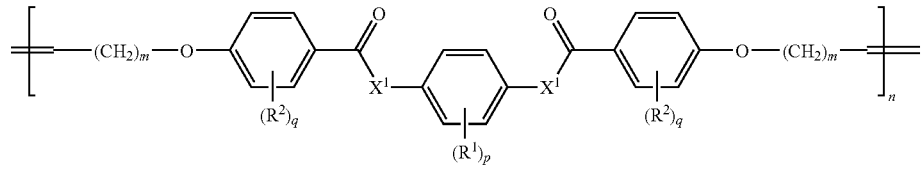

wherein each occurrence of $R^1$ is independently selected from $C_4$-$C_{10}$ tertiary alkyl, $C_6$-$C_{12}$ primary or secondary alkyl, $C_4$-$C_{10}$ tertiary alkoxy, $C_6$-$C_{12}$ primary or secondary alkoxy, unsubstituted or substituted phenoxy, unsubstituted or substituted thiophenoxy, unsubstituted or substituted benzyl, unsubstituted or substituted benzoyl, unsubstituted or substituted phenyl sulfonyl, unsubstituted or substituted phenyl sulfinyl; p is 1, 2, 3, or 4; each occurrence of $R^2$ is independently $C_1$-$C_{12}$ hydrocarbyl; each occurrence of q is independently 0, 1, 2, 3, or 4; each occurrence of m is independently 1, 2, 3, 4, or 5; each occurrence of $X^1$ is —O— or —NH—; and n is about 5 to about 100.

17. The composition of claim 16,
wherein R¹ is t-butyl and p is 1;
wherein each occurrence of q is 0;
wherein each occurrence of m is 3; and
wherein each occurrence of X¹ is —O—.

18. A composition, comprising:
a crosslinked polymer, consisting essentially of first repeating units having the structure

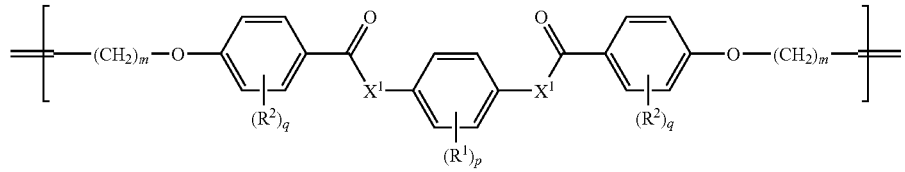

wherein each occurrence of R¹ is independently selected from $C_4$-$C_{10}$ tertiary alkyl, $C_6$-$C_{12}$ primary or secondary alkyl, $C_4$-$C_{10}$ tertiary alkoxy, $C_6$-$C_{12}$ primary or secondary alkoxy, unsubstituted or substituted phenoxy, unsubstituted or substituted thiophenoxy, unsubstituted or substituted benzyl, unsubstituted or substituted benzoyl, unsubstituted or substituted phenyl sulfonyl, unsubstituted or substituted phenyl sulfinyl; p is 1, 2, 3, or 4; each occurrence of R² is independently $C_1$-$C_{12}$ hydrocarbyl; each occurrence of q is independently 0, 1, 2, 3, or 4; each occurrence of m is independently 1, 2, 3, 4, or 5; and each occurrence of X¹ is —O— or —NH—; and second repeating units having the structure

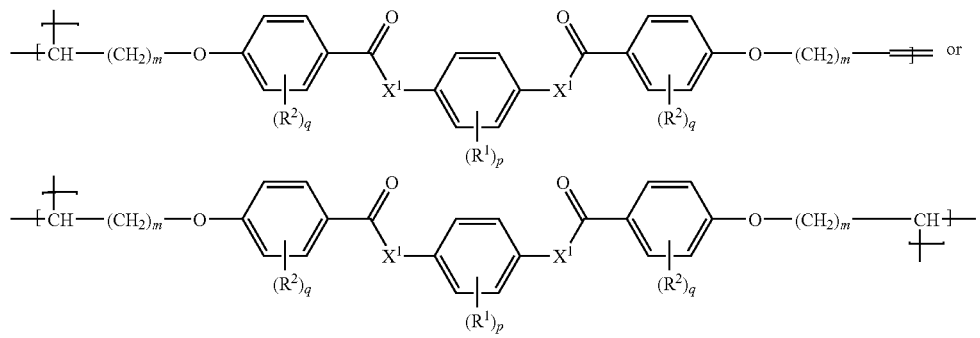

wherein R¹, p, R², q, m, and X¹ are as defined above.

19. The composition of claim 18, wherein the crosslinked polymer comprises about 70 to about 99 weight percent of the first repeating units, and about 1 to about 30 weight percent of the second repeating units.

20. The composition of claim 18,
wherein R¹ is t-butyl and p is 1;
wherein each occurrence of q is 0;
wherein each occurrence of m is 3; and
wherein each occurrence of X¹ is —O—.

21. The composition of claim 18, wherein the crosslinked polymer exhibits a glass transition temperature of about 0 to about 100° C.

22. The composition of claim 21, wherein the crosslinked polymer exhibits a glass transition temperature of at least 25° C.

23. The composition of claim 21, wherein the crosslinked polymer exhibits, on heating and exposure to a mechanical stress of about 10 to about 1000 kiloPascals, a nematic-isotropic transition temperature that is about 5 to about 100° C. greater than the glass transition temperature.

24. The composition of claim 18, wherein the crosslinked polymer exhibits, on cooling and exposure to a mechanical stress of about 10 to about 1000 kilopascals, a transition from a polydomain nematic phase to a monodomain nematic phase at a temperature of about 5 to about 100° C. higher than the glass transition temperature.

25. A method of forming a crosslinked polymer, comprising:
crosslinking an uncrosslinked polymer comprising repeating units having the structure

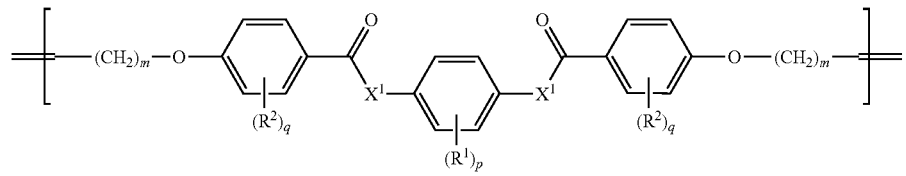

wherein each occurrence of $R^1$ is independently selected from $C_4$-$C_{10}$ tertiary alkyl, $C_6$-$C_{12}$ primary or secondary alkyl, $C_4$-$C_{10}$ tertiary alkoxy, $C_6$-$C_{12}$ primary or secondary alkoxy, unsubstituted or substituted phenoxy, unsubstituted or substituted thiophenoxy, unsubstituted or substituted benzyl, unsubstituted or substituted benzoyl, unsubstituted or substituted phenyl sulfonyl, unsubstituted or substituted phenyl sulfinyl; p is 1, 2, 3, or 4; each occurrence of $R^2$ is independently $C_1$-$C_{12}$ hydrocarbyl; each occurrence of q is independently 0, 1, 2, 3, or 4; each occurrence of m is independently 1, 2, 3, 4, or 5; and each occurrence of $X^1$ is —O— or —NH—.

26. The method of claim 25, wherein said crosslinking comprises reacting the uncrosslinked polymer with a free radical precursor under conditions suitable for generating free radicals from the free radical precursor.

27. The method of claim 26,
wherein the composition exhibits, on heating and exposure to a mechanical stress of about 10 to 1000 kiloPascals, a nematic-isotropic transition temperature; and
wherein the free-radical precursor has a thermal decomposition half-life of ten minutes in the composition at a temperature less than the nematic-isotropic transition temperature.

28. The method of claim 26, wherein the free-radical precursor comprises dicumyl peroxide.

29. The method of claim 26, wherein the free radical precursor is used in an amount of about 0.01 to about 1 mole per mole of aliphatic double bonds in the uncrosslinked polymer.

30. The method of claim 25, wherein said crosslinking comprises exposing the uncrosslinked polymer to an electron beam or electromagnetic radiation having a wavelength of about 0.1 picometer to about 400 nanometers.

31. An article comprising the composition of claim 1.

32. The article of claim 31, wherein the article exhibits at least three shapes as a function of temperature.

33. An article comprising the composition of claim 16.

34. An article comprising the composition of claim 18.

* * * * *